(12) United States Patent
Weisse et al.

(10) Patent No.: US 7,458,780 B2
(45) Date of Patent: Dec. 2, 2008

(54) HOLLOW FAN BLADE FOR GAS TURBINE ENGINE

(75) Inventors: Michael A. Weisse, Tolland, CT (US); William R. Graves, Manchester, CT (US)

(73) Assignee: United Technologies Corporation, Hartford, CT (US)

(*) Notice: Subject to any disclaimer, the term of this patent is extended or adjusted under 35 U.S.C. 154(b) by 540 days.

(21) Appl. No.: 11/203,694

(22) Filed: Aug. 15, 2005

(65) Prior Publication Data

US 2007/0036652 A1    Feb. 15, 2007

(51) Int. Cl.
*F01D 5/18*    (2006.01)
(52) U.S. Cl. .................. 416/233; 416/223 A
(58) Field of Classification Search ............. 416/223 A, 416/232, 233
See application file for complete search history.

(56) References Cited

U.S. PATENT DOCUMENTS

| | | | |
|---|---|---|---|
| 2,644,665 A | 7/1953 | Cangemi | |
| 3,017,159 A | 1/1962 | Foster et al. | |
| 3,533,712 A | 10/1970 | Kercher | |
| 3,628,226 A * | 12/1971 | Nelson ................ | 416/229 A |
| 3,678,802 A | 7/1972 | Butter | |
| 4,501,053 A | 2/1985 | Craig et al. | |
| 4,507,051 A | 3/1985 | Lesgourgues et al. | |
| 4,514,144 A | 4/1985 | Lee | |
| 4,574,451 A | 3/1986 | Smashey et al. | |
| 4,606,778 A | 8/1986 | Jahnke | |
| 5,063,662 A | 11/1991 | Porter et al. | |
| 5,246,340 A | 9/1993 | Winstanley et al. | |
| 5,253,824 A | 10/1993 | Halila et al. | |
| 5,269,058 A | 12/1993 | Wiggs et al. | |
| 5,516,593 A * | 5/1996 | Weisse et al. ............ | 29/889.72 |
| 5,536,143 A | 7/1996 | Jacala et al. | |
| 5,957,658 A | 9/1999 | Kasprow et al. | |
| 5,997,251 A | 12/1999 | Lee | |
| 6,099,252 A | 8/2000 | Manning et al. | |
| 6,146,099 A | 11/2000 | Zipps et al. | |
| 6,331,217 B1 | 12/2001 | Burke et al. | |
| 6,340,047 B1 | 1/2002 | Frey | |

(Continued)

FOREIGN PATENT DOCUMENTS

EP    0468221    1/1992

(Continued)

OTHER PUBLICATIONS

Joe Adams, Tomorrow's Technology Today Prat & Whitney's Vision for the Future, Nov. 6, 2001, pp. 1-21. (Color Article).

(Continued)

*Primary Examiner*—Richard Edgar
(74) *Attorney, Agent, or Firm*—Carlson, Gaskey & Olds

(57) ABSTRACT

Hollow fan blades for turbo fan gas turbine engines are formed of two separate detail halves. Each detail half has a plurality of cavities machined out to reduce weight and form ribs. The ribs extend continuously and without intersecting one another in order to facilitate machining. The ribs extend in different directions in different regions of the detail half. In at least one region, the ribs extend in a serpentine pattern, such that concatenated rib segments are substantially perpendicular to one another, thereby providing stiffness in multiple directions.

20 Claims, 3 Drawing Sheets

U.S. PATENT DOCUMENTS

| | | |
|---|---|---|
| 6,607,355 B2 | 8/2003 | Cunha et al. |
| 6,637,186 B1 | 10/2003 | Van Duyn |
| 6,994,524 B2 | 2/2006 | Owen et al. |
| 6,994,525 B2 | 2/2006 | Weisse et al. |
| 7,052,238 B2 | 5/2006 | Whitesell et al. |
| 7,070,391 B2 | 7/2006 | Weisse |
| 2005/0160599 A1 | 7/2005 | Palazzini |
| 2005/0163617 A1 | 7/2005 | Weisse |
| 2005/0163618 A1 | 7/2005 | Owen |
| 2005/0163619 A1 | 7/2005 | Weisse |
| 2005/0163620 A1 | 7/2005 | Whitesell |

FOREIGN PATENT DOCUMENTS

| | | |
|---|---|---|
| EP | 0 902 165 A2 | 3/1999 |
| EP | 0902165 | 3/1999 |
| GB | 619107 | 3/1949 |
| JP | 58148201 A | 9/1983 |
| JP | 358148201 A | 9/1983 |

OTHER PUBLICATIONS

Adams, Joe. "Tomorrow's Technology Today: Pratt & Whitney's Vision for the Future," Nov. 6, 2001, pp. 1-21.

European Office Action dated Apr. 24, 2006 for European Application No. 05250320.8.

European Search Report dated Dec. 6, 2005 for European Application No. 05250319.0.

European Search Report dated Dec. 1, 2005 for European Application No. 05250321.6.

European Search Reporrt dated Dec. 1, 2005 for European Application No. 05250323.2.

European Search Report dated Dec. 1, 2005 for European Application No. 05250322.4.

* cited by examiner

HOLLOW FAN BLADE FOR GAS TURBINE ENGINE

BACKGROUND OF THE INVENTION

The present invention relates generally to gas turbine engines and more particularly to an improved hollow fan blade for a gas turbine engine.

A gas turbine engine, such as a turbo fan engine for an aircraft, includes a fan section, a compression section, a combustion section and a turbine section. An axis of the engine is centrally disposed within the engine and extends longitudinally through the sections. The primary flow path for working medium gases extends axially through the sections of the engine. A secondary flow path for working medium gases extends parallel to and radially outward of the primary flow path.

The fan section includes a rotor assembly and a stator assembly. The rotor assembly of the fan includes a rotor disc and plurality of radially extending fan blades. The fan blades extend through the flow path and interact with the working medium gases and transfer energy between the fan blades and working medium gases. The stator assembly includes a fan case, which circumscribes the rotor assembly in close proximity to the tips of the fan blades.

During operation, the fan draws the working medium gases, more particularly air, into the engine. The fan raises the pressure of the air drawn along the secondary flow path, thus producing useful thrust. The air drawn along the primary flow path into the compressor section is compressed. The compressed air is channeled to the combustion section where fuel is added to the compressed air and the air/fuel mixture is burned. The products of combustion are discharged to the turbine section. The turbine section extracts work from these products to power the fan and compressed air. Any energy from the products of combustion not needed to drive the fan and compressor contributes to useful thrust.

In order to reduce weight, the fan blades in some gas turbine engines are hollow. Each fan blade is made by combining two separate detail halves. Each half includes a plurality of cavities and ribs machined out to reduce the weight while forming a structurally sound internal configuration. These halves are subsequently bonded to form the hollow fan blade. The hollow fan blade is then subjected to forming operations at extremely high temperatures at which time it is given an airfoil shape and geometry.

To a large extent, the internal geometry of the hollow fan blades has been designed to provide bird-impact capabilities. The previous hollow fan blades had an internal geometry comprising numerous machined internal cavities and associated ribs primarily running radially with secondary ribs running chord-wise. When the fan blades encounter large loading, the cavities are susceptible to buckling when the loads are applied in a direction perpendicular to the ribs.

Outer spans typically are subject to loads from bird (or other foreign object) impact, which applies a heavy initial load at the leading edge, tending to cause bending of the airfoil at the leading edge. For this load, spanwise ribs and cavities offer the least resistance to buckling, and it's for this reason that advanced blade configurations feature outer span ribs that run chordwise. But there are secondary loads milliseconds after the impact, causing a shock wave that radiates out from the impact site, which flexes the metal as it passes the loads onward. Subsequently, the blade tip will flex back and forth until the energy from the event can be absorbed. Cavities which run parallel to the bending motion will be much more likely to buckle than those that run perpendicular.

Blade tips are also subject to occasional circumferential loading when blades rub the case during heavy crosswinds or maneuver loading, or in a severe case, during a blade out event. For tip rubs, chordwise cavities tend to be prone to buckling.

SUMMARY OF THE INVENTION

The present invention provides a hollow fan blade with internal cavity and rib geometry with improved durability while minimizing weight and cost. In the present invention, regions of the hollow fan blade that may be loaded in multiple directions, such as the outer half span, feature cavities and ribs that do not run solely spanwise or chordwise, but curve and change direction. As a result, these regions do not form "hinge lines" and long, straight cavities with low cross-sectional inertia are eliminated.

Rib segments that run roughly perpendicular to each other provide mutual support, with a secondary benefit of minimizing the volume of any fillets where two ribs meet. The thickness of the walls can be reduced because of the improved arrangement of the ribs. This configuration of ribs provides stiffness in multiple directions while minimizing the cost and complexity of the manufacturing process by using primarily continuous cavities to form the ribs.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
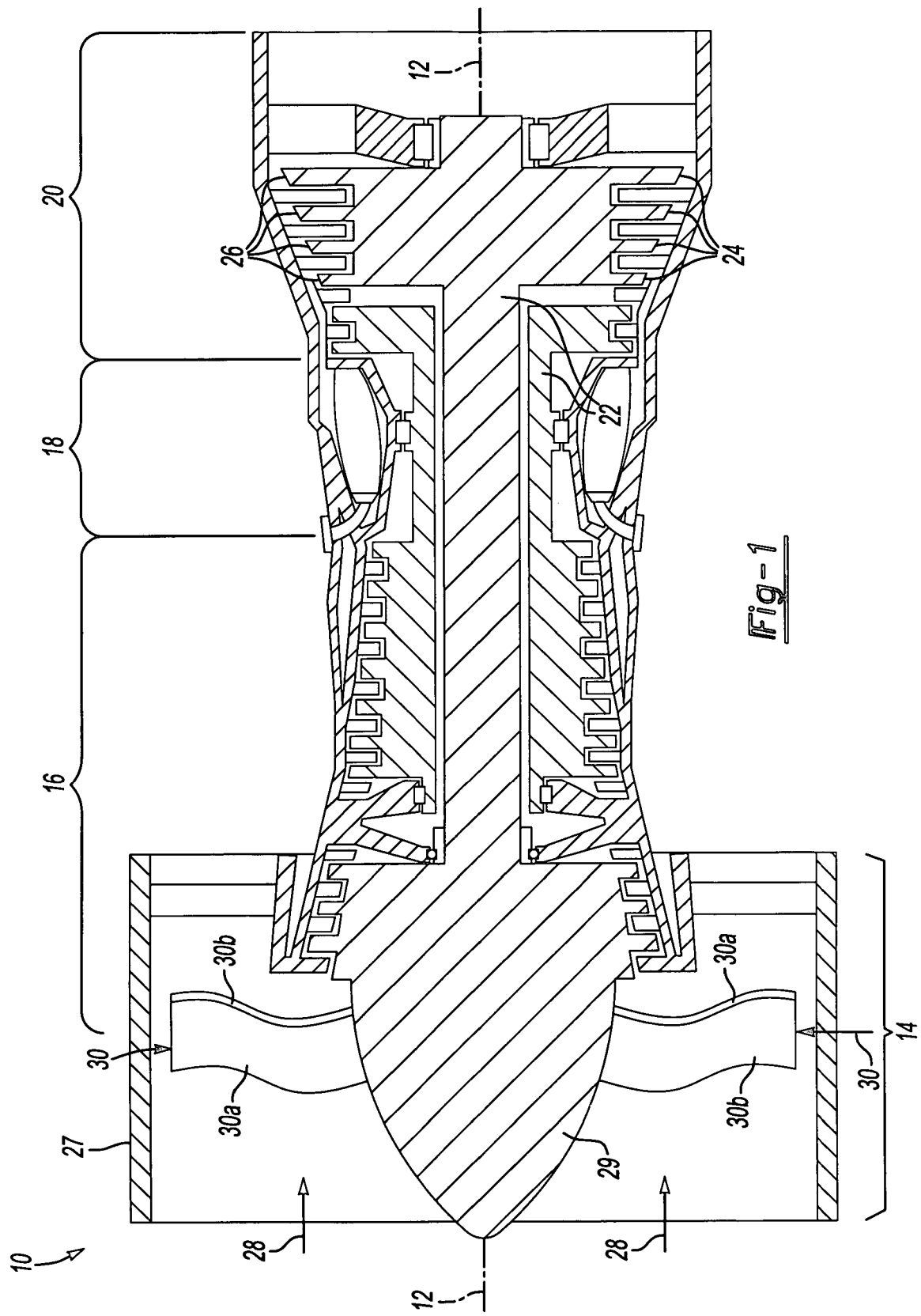
FIG. 1 is a sectional view of an axial flow, turbo fan gas turbine engine with the hollow fan blades of the present invention.

A gas turbine engine 10, such as a turbofan gas turbine engine, circumferentially disposed about an engine centerline, or axial centerline axis 12 is shown. The engine 10 includes a fan 14, a compressor 16, a combustion section 18 and a turbine 20. As is well known in the art, air compressed in the compressor 16 is mixed with fuel, which is burned in the combustion section 18 and expanded in turbine 20. The air compressed in the compressor and the fuel mixture expanded in the turbine 20 can both be referred to as a hot gas stream flow 28. The turbine 20 includes rotors 22 that rotate in response to the expansion, driving the compressor 16 and fan 14. The turbine 20 comprises alternating rows of rotary airfoils or blades 24 and static airfoils or vanes 26.

The fan 14 is surrounded by a fan case 27 and includes a rotor assembly. The rotor assembly includes a rotor disk 29 and a plurality of fan blades 30. Each fan blade 30 extends radially outwardly from the rotor disk 29 across the working medium flow paths into proximity with the fan case 27. The fan blades 30 are hollow fan blades and include a first hollow fan blade detail half 30a and a second hollow fan blade detail half 30b, one forming a pressure side wall and the other forming a suction side wall.

Figure 2:
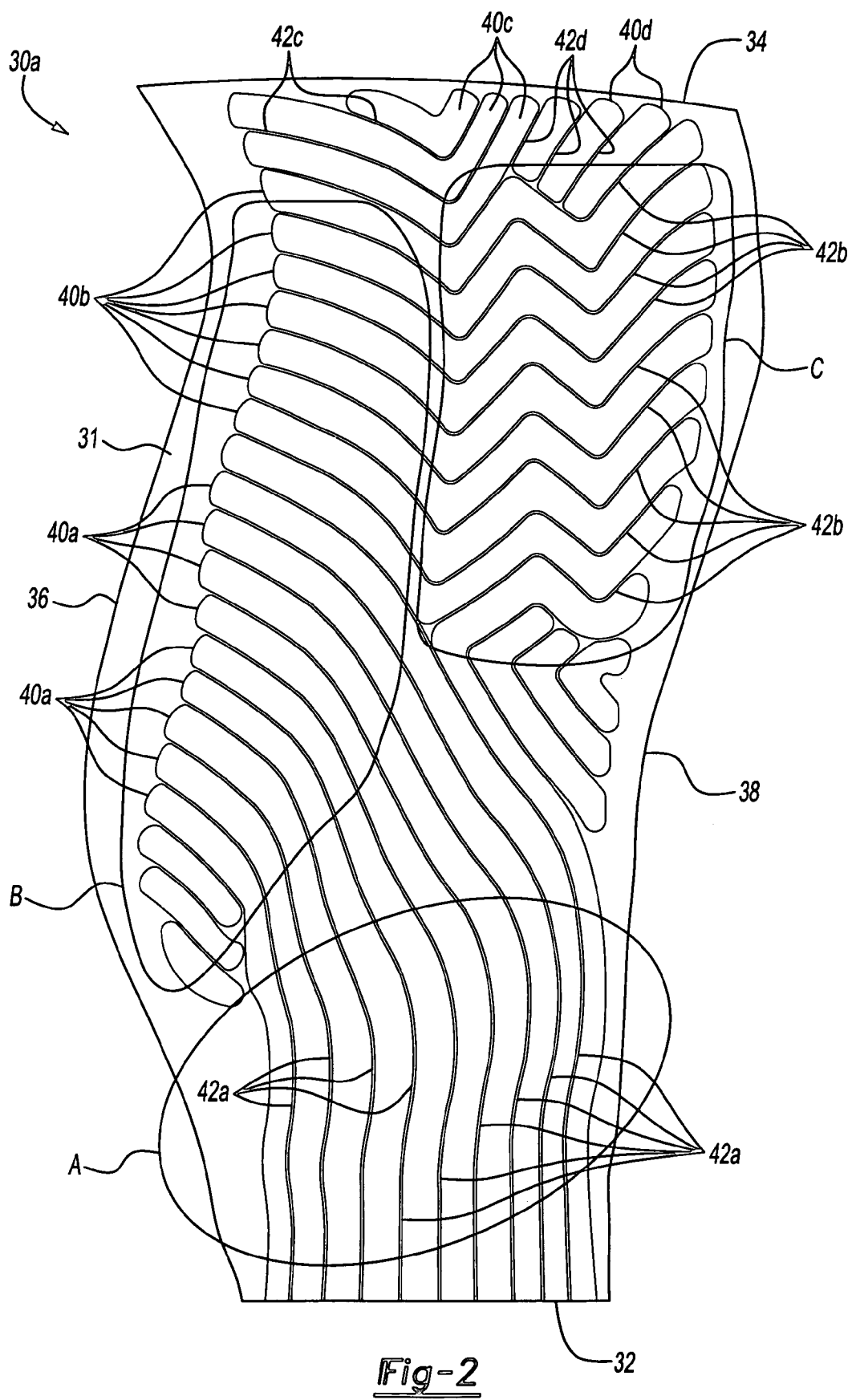
FIG. 2 is a plan view of one detail half of one of the hollow fan blades of FIG. 1.

A first embodiment of one fan blade detail half 30a is shown in FIG. 2. The other fan blade detail half 30b would be complementary. The fan blade detail half 30a comprises a substrate 31, preferably Titanium, having a root edge 32 opposite a tip 34 and a leading edge 36 opposite a trailing edge 38. The fan blade detail half 30a includes Region A, which is approximately the radially innermost third adjacent the root edge 32. Region B extends along the leading edge 36 from Region A toward the tip 34. Between Region B and the trailing edge 38, and spaced from the tip 34, is Region C.

In order to reduce weight while still maintaining the necessary stiffness and strength, a plurality of elongated continuous cavities 40a-d are machined into the interior surface of the substrate 31. The cavities 40a-d are spaced from one another to form a plurality of continuous, non-intersecting ribs 42a-d. Alternatively (or additionally), the ribs 42a-d are superplastically formed. Throughout this description, the reference numeral 40 may be used to refer to the cavities 40 generically, while for specific subsets of cavities 40, the reference numeral 40 will be appended with one or more of the letters a-d. Similarly, the reference numeral 42 may be used generically for the ribs 42a-d.

The ribs 42 are oriented and biased in order to provide stiffness where needed, both during forming and during use in the turbine engine 10 of FIG. 1. Further, the ribs 42 curve and change direction to eliminate any long, straight cavities 40, which would have low inertia. Preferably, the cavities 40 do not continue in any direction for lengths greater than half the blade chord.

A first subset of cavities 40a and ribs 42a extend continuously from the root edge 32 toward the leading edge 36. The cavities 40a and ribs 42a extend from the root edge 32 initially radially outward (i.e. toward the tip 34) in Region A and then curve slightly away from and then toward the leading edge 36 at substantially a 45 degree angle but in a curved path in Region B. Region A is an area of significant blade pull (i.e. high tensile stress). The portions of the ribs 42a in Region A help carry the load on the blade half 30a. The radially extending portions of ribs 42a also minimize any stress concentration from the fillets. The slight curves in Region A prevent the cavity 40a from collapsing during the forming process, when the fan blade detail half 30a is formed to its desired shape.

Some of the cavities 40 and ribs 42 in Region B, i.e. a second subset of cavities 40b and ribs 42b positioned radially outward of the first subset of cavities 40a and ribs 42a, extend continuously from the leading edge 36 toward the trailing edge 38 and curve downwardly toward the root edge 32 at approximately a 45 degree angle in a curved path to an approximate midline, where they then extend continuously into Region C. The portions of the ribs 42a and ribs 42b in Region B extend substantially chordwise (at approximately a 30-60 degree angle) at the leading edge 36 to provide bird strike stiffness. In Region C, the ribs 42b and cavities 40b extend continuously in a serpentine path through successive alternating substantially perpendicular turns. In the embodiment shown, each rib 42b and cavity 40b extends continuously through three turns of approximately ninety degrees, approximately negative ninety degrees and then approximately ninety degrees. These concatenated, substantially perpendicular rib segments of the ribs 42b provide mutual support and form roughly W-shaped rib portions. The W-shaped rib portions of ribs 42b (in Region C) provide stiffness in multiple directions and provide improved resistance to buckling, particularly in birdstrike events. This may permit a reduction in the thickness of the wall of the blade detail half 30, thereby reducing overall weight and cost.

Depending upon the particular design requirements, the transition between Region B, where the portions of the ribs 42a and ribs 42b extend substantially chordwise, and Region C, where the rib segments of the ribs 42b extend in a serpentine path, could be located closer to the leading edge 36 or closer to the trailing edge 38 than as shown. Also, the number of substantially perpendicular rib segments of the ribs 42b in Region C could be increased or decreased from that shown.

A third subset of cavities 40c and ribs 42c adjacent the tip 34 extend continuously along a curve approximately 30-60 degree chordwise path and then sharply curve perpendicularly to extend substantially radially toward the tip 34 at approximately a 45-60 degree angle. A fourth subset of short cavities 40d and ribs 42d adjacent the tip 34 on the trailing half extend continuously along a curved path substantially radially and toward the tip 34 and the trailing edge 38 at an approximately 45-60 degree angle.

Generally, near the tip 34, stiffness is needed in the radial direction for tip rub events. Diagonal stiffness is needed in the corners adjacent the tip 34 and leading edge 36 and adjacent the tip 34 and trailing edge 38.

Figure 3:
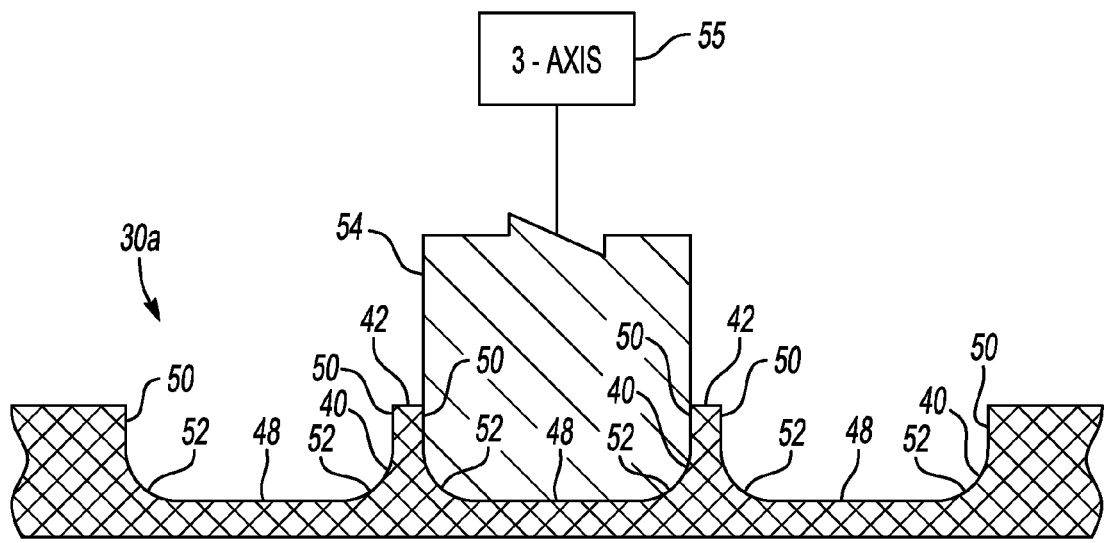
FIG. 3 is a sectional view through three of the cavities of the detail half of FIG. 2 and through a cutter for forming the cavities.

FIG. 3 is a sectional view of the detail half 30a being machined by a cutter 54. Each cavity 40 has a floor 48 between opposite wall interior surfaces 50, some of which define the ribs 42. Each cavity 40 further includes a radius 52 transition between the wall interior surface 50 and the floor 48. As shown, the floor 48 and both wall interior surfaces 50 are preferably cut simultaneously in a single pass by the cutter 54. Because the cavities 40 are continuous and the ribs 42 do not intersect, each cavity 40 is formed in a single pass with a single cutter. Alternatively, the cavities 40 may each be formed in a single rough cut and a second, finish cut, but this is still a significant reduction in the number of cuts and cutters required. Additionally, because floor radius is relatively large and approximately follows the curvature of the external surface of the cutter 54 can be operated by a 3-axis machine 55 (shown schematically), instead of the previously-required 5-axis machine. In addition, because there are no transversely-extending ribs intersecting the ribs 42 the number of cutters of different diameters required is greatly reduced. A detail half could conceivably be done with a single form cutter, including both rough and finish passes. The other fan blade detail half 30b would be made in a similar manner.

Figure 4:
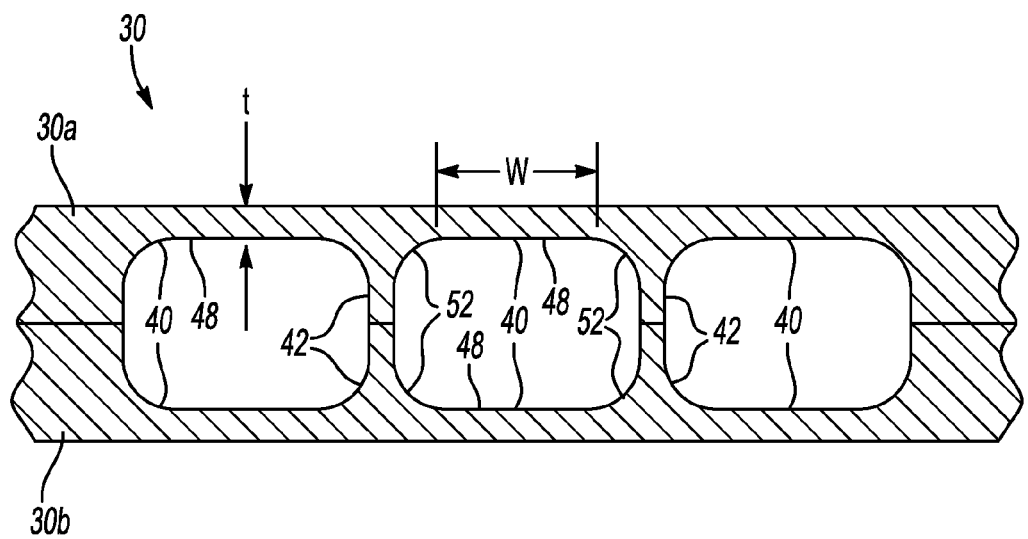
FIG. 4 is a sectional view through an assembled fan blade corresponding to the fan blade detail half of FIG. 3.

FIG. 4 is a sectional view of a portion of the fan blade 30. The ribs 42 of fan blade detail half 30a are aligned and joined with the ribs 42 of the fan blade detail half 30b. To provide increased strength during forming and during use, the ribs 42 are tapered and transition into a compound radius (including radius 52 and the floor 48) that simulates the classical arch design element. The two radii (of the radius 52 and floor 48) should be selected such that the transition between each other and the tapered wall geometry are smooth and gradual. The sizing will depend upon the required load transitioning and carrying capabilities. Preferably, the ratio of the width w of the cavity at the rib wall fillet run out to the thickness t of the floor 48 should be less than ten, but can be larger if the rib can be aligned more parallel to the load.

After the halves 30a,b are bonded, the fan blade 30 is given an airfoil shape in a forming operation. During the forming operation, the two detail halves are twisted and cambered to the desired shape under high heat.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in the method claims are for ease of reference by dependent claims, and do not indicate a required sequence, unless otherwise indicated.

What is claimed is:

1. A hollow fan blade detail half comprising:
   a substrate having a root edge and an opposite tip spaced radially outward from the root, the substrate further including a leading edge opposite a trailing edge, the leading edge spaced chordwise from the trailing edge, the substrate including a first surface; and
   a plurality of serpentine rib portions in a first region of the substrate, wherein the serpentine rib portions are each portions of one of a plurality of first ribs, the first ribs extending continuously into a second region adjacent the leading edge of the substrate and extending at an acute angle toward the tip and the leading edge in the second region.

2. The hollow fan blade detail half of claim 1 wherein the plurality of serpentine rib portions do not intersect one another or any other rib portions.

3. The hollow fan blade detail half of claim 2 wherein the plurality of serpentine rib portions are at least partially defined by a plurality of substantially parallel, elongated, continuous cavities formed in the first surface of the substrate.

4. The hollow fan blade detail half of claim 3 wherein the first region is generally located adjacent the tip and the trailing edge.

5. The hollow fan blade detail half of claim 1 wherein each of the plurality of serpentine rib portions includes a plurality of substantially perpendicular concatenated rib segments.

6. The hollow fan blade detail half of claim 1 wherein each of the plurality of serpentine rib portions includes a plurality of substantially perpendicular concatenated rib segments.

7. A hollow fan blade including a pair of joined hollow fan blade detail halves according to claim 1 wherein the plurality of serpentine rib portions in one of the pair of hollow fan blade detail halves are joined to corresponding serpentine rib portions in the other of the pair.

8. A gas turbine engine including a plurality of the hollow fan blades of claim 7.

9. A method for making a hollow fan blade detail half including the steps of:
   a) forming a set of substantially parallel continuous serpentine first rib portions on a substrate in a first region, each of the first rib portions including a plurality of substantially perpendicular concatenated rib segments, wherein the first rib portions do not intersect one another or any other rib portions; and
   b) forming a set of substantially parallel continuous serpentine first cavities adjacent each of the first rib portions.

10. The method of claim 9 wherein the first region is adjacent a tip of the substrate.

11. The method of claim 10 wherein the first region is adjacent a trailing edge of the substrate.

12. The method of claim 9 wherein steps a) and b) are performed by machining the first cavities in the substrate.

13. A hollow fan blade comprising:
    a pressure side wall having a tip, a leading edge and a trailing edge;
    a suction side wall spaced from the pressure side wall; and
       a plurality of serpentine rib portions extending between the pressure side wall and the suction side wall, the plurality of serpentine rib portions extending substantially chordwise.

14. The hollow fan blade of claim 13 wherein the plurality of serpentine rib portions do not intersect one another or any other rib portions.

15. The hollow fan blade of claim 13 wherein the plurality of serpentine rib portions are at least partially defined by a plurality of substantially parallel, elongated, continuous cavities formed in the pressure side wall and the suction side wall.

16. The hollow fan blade of claim 15 wherein the plurality of serpentine rib portions are generally located adjacent the tip and the trailing edge.

17. The hollow fan blade of claim 13 wherein the plurality of serpentine rib portions extend from the leading edge toward the trailing edge.

18. The hollow fan blade of claim 17 wherein the plurality of serpentine rib portions each include a first segment extending from the leading edge at an angle toward a root edge opposite the tip and toward the trailing edge.

19. The hollow fan blade of claim 13 wherein the plurality of serpentine rib portions each includes at least three concatenated, substantially perpendicular rib segments.

20. The hollow fan blade of claim 19 further including a plurality of ribs extending from a root edge opposite the tip and curving toward the leading edge, the plurality of serpentine rib portions radially outward of the plurality of ribs.

* * * * *